United States Patent
Tokuda (10) Patent No.: US 9,479,634 B2
(45) Date of Patent: Oct. 25, 2016

(54) MOBILE TERMINAL TEMPERATURE CONTROL THAT SETS FUNCTION OPERATION MODE BASED ON USAGE TIME HISTORY

(71) Applicant: FUJITSU LIMITED, Kawasaki-shi, Kanagawa (JP)

(72) Inventor: Yoshinori Tokuda, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 164 days.

(21) Appl. No.: 14/272,252

(22) Filed: May 7, 2014

(65) Prior Publication Data

US 2014/0380029 A1  Dec. 25, 2014

(30) Foreign Application Priority Data

Jun. 21, 2013 (JP) ................. 2013-131166

(51) Int. Cl.
*G06F 1/20* (2006.01)
*H04M 1/725* (2006.01)

(52) U.S. Cl.
CPC .......... *H04M 1/72569* (2013.01); *G06F 1/206* (2013.01); *H04M 1/72577* (2013.01); *H04M 2250/12* (2013.01)

(58) Field of Classification Search
CPC .............................. H04N 19/156; G06F 1/206
See application file for complete search history.

(56) References Cited

U.S. PATENT DOCUMENTS

| 2012/0189264 A1 | 7/2012 | Okazaki et al. |
| 2012/0189265 A1 | 7/2012 | Okazaki et al. |
| 2013/0002798 A1* | 1/2013 | Sano ............... H04N 7/141 348/14.02 |
| 2013/0241942 A1* | 9/2013 | Bennett ............ G06F 3/14 345/520 |

FOREIGN PATENT DOCUMENTS

| JP | 2004-056440 A | 2/2004 |
| JP | 2012-165372 A | 8/2012 |
| JP | 2012-165373 a | 8/2012 |

* cited by examiner

*Primary Examiner* — Albert Wang
(74) *Attorney, Agent, or Firm* — Maschoff Brennan

(57) ABSTRACT

A mobile terminal apparatus includes a detection unit that detects a temperature of the mobile terminal apparatus, a determination unit that determines whether or not the detected temperature is a predetermined value or more, an analysis unit that collects and analyzes usage histories of a function of the mobile terminal apparatus, and a setting unit that, when the detected temperature is the predetermined value or more, refers to an analysis result of the usage histories, and when the function tends to be used for a predetermined usage time period or more, sets an operation mode of the function to a first mode in which an action performed by the function is restricted, and when the function tends to be used for less than the predetermined usage time period, sets the operation mode to a second mode in which the action performed by the function is not restricted.

9 Claims, 10 Drawing Sheets

MOBILE TERMINAL TEMPERATURE CONTROL THAT SETS FUNCTION OPERATION MODE BASED ON USAGE TIME HISTORY

CROSS-REFERENCE TO RELATED APPLICATION

This application is based upon and claims the benefit of priority of the prior Japanese Patent Application No. 2013-131166, filed on Jun. 21, 2013, the entire contents of which are incorporated herein by reference.

FIELD

The embodiments discussed herein are related to a mobile terminal apparatus, a recording medium storing a terminal control program, a terminal control method, and a terminal control system.

BACKGROUND

In a mobile terminal apparatus, when a function in which a load on a central processing unit (CPU) is high, such as moving-image capturing, is performed, an amount of heat generated by the CPU increases. For this reason, in the mobile terminal apparatus, when the temperature of the mobile terminal apparatus rises due to the increase in the amount of heat generated and reaches a critical value, the function in which a load on the CPU is high, such as moving-image capturing, is stopped for the sake of safety.

However, since the function, such as moving-image capturing, being performed is stopped because the temperature of the mobile terminal apparatus has reached the critical value, that is, the function is stopped while a user is using the function, a user's demand for moving-image capturing or the like is no longer able to be satisfied.

In one aspect, there are provided a mobile terminal apparatus, a recording medium storing a terminal control program, a terminal control method, and a terminal control system which are able to stop the temperature of the mobile terminal apparatus from reaching a critical value.

Related art is disclosed in Japanese Laid-open Patent Publication No. 2004-56440.

SUMMARY

According to an aspect of the invention, a mobile terminal apparatus includes: a detection unit that detects a temperature of the mobile terminal apparatus; a determination unit that determines whether or not the detected temperature is a predetermined value or more; an analysis unit that collects and analyzes usage histories of a function of the mobile terminal apparatus; and a setting unit that, when the detected temperature is the predetermined value or more, refers to an analysis result of the usage histories, and when the function tends to be used for a predetermined usage time period or more, sets an operation mode of the function to a first mode in which an action performed by the function is restricted, and when the function tends to be used for less than the predetermined usage time period, sets the operation mode to a second mode in which the action performed by the function is not restricted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a mobile terminal apparatus, a terminal control program, and a terminal control method which are discussed herein will be described below in detail with reference to the drawings. The technique to be disclosed is not limited by the embodiments. Also, the following embodiments may be appropriately combined within the range in which no inconsistencies are generated.

First Embodiment

Figure 1:
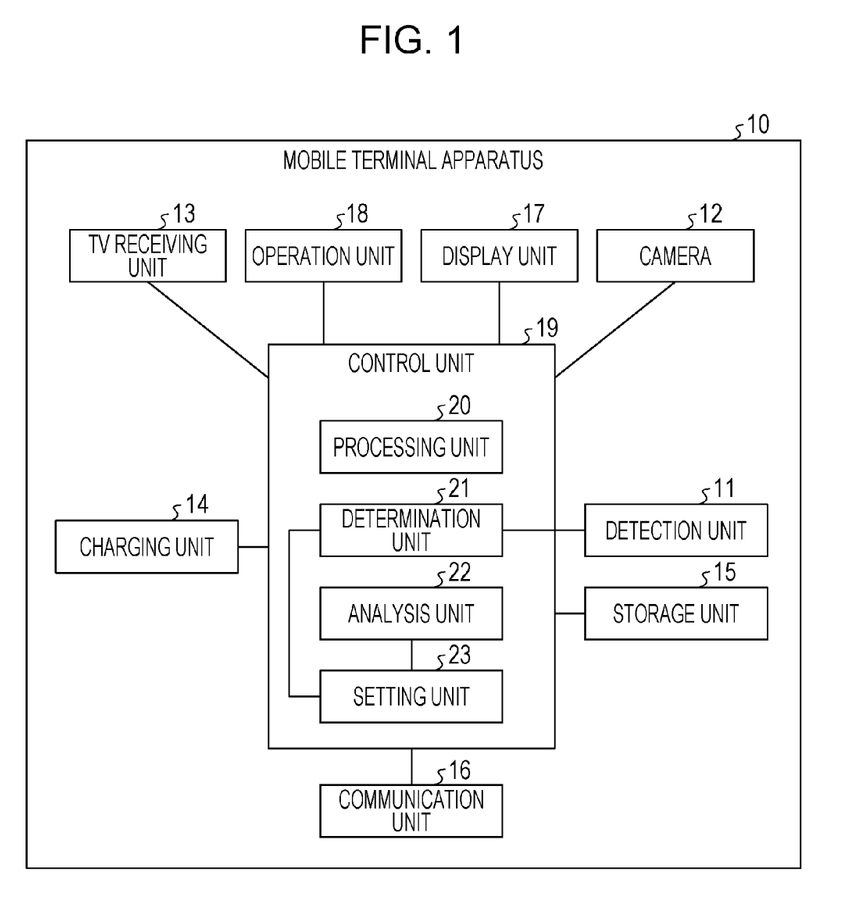
FIG. 1 is a block diagram illustrating an example of the configuration of a mobile terminal apparatus according to a first embodiment.

FIG. 1 is a block diagram illustrating an example of the configuration of a mobile terminal apparatus according to a first embodiment. A mobile terminal apparatus 10 illustrated in FIG. 1 includes a detection unit 11, a camera 12, a television (TV) receiving unit 13, a charging unit 14, a storage unit 15, a communication unit 16, a display unit 17, an operation unit 18, and a control unit 19.

The detection unit 11 detects a temperature of the mobile terminal apparatus 10. The detection unit 11 has a temperature sensor, such as a thermistor or a thermal diode, and outputs temperature information to the control unit 19. The detection unit 11 may also use a thermal diode built into the control unit 19.

The camera 12 has an image sensor and captures an image. As the image sensor, for example, a complementary metal oxide semiconductor (CMOS) image sensor or a charge coupled device (CCD) image sensor may be used. The camera 12 is capable of capturing a moving image and a still image. The camera 12 is capable of capturing a moving image at, for example, a 1080i or the like full high definition video (FHD) image quality, or a 720p or the like high definition video (HD) image quality. The camera 12 outputs, as image data, a captured moving image or still image to the control unit 19.

The TV receiving unit 13 receives a digital terrestrial television broadcast using, for example, an integrated services digital broadcasting-terrestrial (ISDB-T) system. The TV receiving unit 13 receives, as a digital terrestrial television broadcast, a high-definition broadcast using 12 segments (hereinafter referred to as a full-seg broadcast), and a "one segment receiving service for mobile phones and mobile terminals" using one segment (hereinafter referred to as a one-seg broadcast). The TV receiving unit 13 outputs received data to the control unit 19.

The charging unit 14 calculates the amount of charge remaining in a secondary battery, which is not illustrated, built into the mobile terminal apparatus 10, and outputs information on the remaining amount of charge to the control unit 19. When an external power supply is connected to the mobile terminal apparatus 10 and a charging instruction is input from the control unit 19, the charging unit 14 charges the secondary battery. When the charging unit 14 performs charging with a large current, an amount of heat generated by the charging unit 14 increases.

The storage unit 15 is implemented by, for example, a semiconductor memory device, such as a random access memory (RAM) or a flash memory, or a storage device, such as a hard disk or an optical disc. The storage unit 15 stores temperature information, control information (a critical value and a predetermined value), a usage history, an analysis result, and so forth. The storage unit 15 stores information to be used in processes performed in the control unit 19.

The communication unit 16 is implemented by, for example, a wireless communication module designed for a mobile phone line, a local area network (LAN) and the like. Here, examples of a mobile phone line that may be used include a 3.9 generation (for example, long term evolution (LTE)) or the like line in which communication speed is high and an amount of heat generated is high, and a 3 or 3.5 generation line in which communication speed is low and an amount of heat generated is low. The communication unit 16 is a communication interface that is connected to, for example, the Internet via a wireless base station and performs communication of various pieces of information.

The display unit 17 is a display device that displays various pieces of information. For example, the display unit 17 is implemented by a liquid crystal display or the like. The operation unit 18 is an input device that accepts various operations from a user. For example, the operation unit 18 is implemented by cursor keys, a numeric keypad, or the like. Also, in the case where a touch panel is employed in the mobile terminal apparatus 10, the display unit 17 and the operation unit 18 are integrated into a single unit.

The control unit 19 is implemented by, for example, a CPU, a micro processing unit (MPU), or the like executing, in a RAM serving as a working region, a program stored in an internal storage device. The control unit 19 may also be implemented by, for example, an integrated circuit, such as an application specific integrated circuit (ASIC) or a field programmable gate array (FPGA). The control unit 19 includes a processing unit 20, a determination unit 21, an analysis unit 22, and a setting unit 23, and implements or performs information processing functions or operations, which will be described below. The internal configuration of the control unit 19 is not limited to the configuration illustrated in FIG. 1, and another configuration may be employed as long as it is a configuration in which information processing to be described is performed.

Image data is input from the camera 12 to the processing unit 20. The processing unit 20 performs image processing, such as compression, editing, and display processing, on the image data. Also, the image processing may be performed by a graphics processing unit (GPU), which is not illustrated. The processing unit 20 stores the image data having been subjected to the image processing in the storage unit 15, and also displays the image data on the display unit 17.

Received data is input from the TV receiving unit 13 to the processing unit 20. The processing unit 20 performs an access control process, a decoding process, and so forth on the received data, and generates image data. The processing unit 20 displays the generated image data on the display unit 17. In addition, the processing unit 20 may perform image processing on the generated image data, as in the image data input from the camera 12, and may also store the image data in the storage unit 15.

Information on a remaining amount of charge is input from the charging unit 14 to the processing unit 20. When the external power supply is connected to the mobile terminal apparatus 10, the processing unit 20 determines, by using the information on the remaining amount of charge, whether or not the secondary battery has to be charged. When the processing unit 20 determines that charging has to be performed, the processing unit 20 outputs a charging instruction to the charging unit 14.

The processing unit 20 connects to various servers on the Internet via the communication unit 16 and performs data communication. The processing unit 20 reads data from the storage unit 15, performs a process of storing the data in a packet or the like, and then transmits the packet to the various servers. Also, the processing unit 20 performs a process of taking data from packets received from the various servers, and stores the taken data in, for example, the storage unit 15.

The processing unit 20 reads moving image data stored in the storage unit 15, and performs image processing, such as decompression and display processing, on the data. Also, the image processing may be performed by the GPU, which is not illustrated. The processing unit 20 displays the data having been subjected to the image processing on the display unit 17.

Temperature information is input from the detection unit 11 to the determination unit 21. The determination unit 21 determines whether or not a temperature contained in the temperature information is more than or equal to a critical value at which a function in which a load on the CPU is high or a charging function is stopped. When the temperature is more than or equal to the critical value, the determination unit 21 stops the function in which a load on the CPU is high or the charging function. Here, examples of the function in which a load on the CPU is high include a camera function, a television receiving function, a data communication function, and a moving image playing function. Also, when the temperature is more than or equal to the critical value and when the built-in secondary battery is being charged, the determination unit 21 stops the charging function.

When the temperature is less than the critical value, the determination unit 21 determines whether or not the function in which a load on the CPU is high or the charging function has been stopped. When the temperature is less than the critical value and when the function in which a load on the CPU is high or the charging function has been stopped, the determination unit 21 cancels the stopping of the function in which a load on the CPU is high or the charging function.

When the function in which a load on the CPU is high or the charging function is being performed, the determination unit 21 determines whether or not the temperature is more than or equal to a predetermined value stored as control information in the storage unit 15. When the temperature is more than or equal to the predetermined value, the determination unit 21 outputs, to the setting unit 23, mode setting information for enabling mode setting. When the temperature is less than the predetermined value, the determination unit 21 ends processing. Here, the predetermined value that is a temperature at which the mode setting information is output is a temperature less than the critical value. For example, when the critical value is 50° C., the predetermined value may be set to, for example, 40° C. The critical value and the predetermined value are not limited to this example, and may be set to any value.

The analysis unit 22 collects usage information of the function in which a load on the CPU is high or the charging function, and stores, as usage histories, the usage information in the storage unit 15. When the analysis unit 22 collects a predetermined number (N) or more pieces of usage information, the analysis unit 22 reads usage histories from the storage unit 15, analyzes the usage histories, and stores an analysis result in the storage unit 15. Here, as usage information, for example, a usage time period of the function in which a load on the CPU is high or the charging function per operation may be used. Analysis of usage histories may be started, for example, when five pieces of usage information are collected. Also, the analysis unit 22 may use, as an analysis result, an average value or standard deviation of usage time periods, or the like.

When mode setting information is input from the determination unit 21, the setting unit 23 determines whether or not an analysis result stored by the analysis unit 22 has been stored in the storage unit 15. When no analysis result has been stored in the storage unit 15, the setting unit 23 operates in an initial set-up operation mode. When an analysis result has been stored in the storage unit 15, the setting unit 23 reads the analysis result from the storage unit 15. The setting unit 23 determines, by using the analysis result, whether or not the function in which a load on the CPU is high or the charging function tends to be used for a predetermined time period or more. For example, when the predetermined time period is five minutes, in the case where the user tends to use the function in which a load on the CPU is high for a short time period, that is, two to three minutes, the setting unit 23 determines that the function does not tend to be used for the predetermined time period or more. Also, for example, when the predetermined time period is five minutes, in the case where the user tends to use the function in which a load on the CPU is high for a long time period, that is, about ten minutes, the setting unit 23 determines that the function tends to be used for the predetermined time period or more.

When the function in which a load on the CPU is high or the charging function tends to be used for the predetermined time period or more, the setting unit 23 sets the operation mode to a first mode. Here, the first mode is a mode in which an action performed by the function in which a load on the CPU is high or the charging function is restricted. In the first mode, for example, in the case of the camera function, an image quality is set to an HD image quality when a moving image is captured, and, in the case of the television receiving function, a one-seg broadcast is received. Also, in the first mode, for example, in the case of the data communication function, a 3 or 3.5 generation line is used, and, in the case of the moving image playing function, a moving image is played at a low frame rate. Furthermore, in the first mode, for example, in the case of the charging function, a charging current to the secondary battery is restricted.

When the function in which a load on the CPU is high or the charging function does not tend to be used for the predetermined time period or more, the setting unit 23 sets the operation mode to a second mode. Here, the second mode is a mode in which an action performed by the function in which a load on the CPU is high or the charging function is not restricted. That is, in the second mode, for example, in the case of the camera function, an image quality is set to an FHD image quality when a moving image is captured, and, in the case of the television receiving function, a full-seg broadcast is received. Also, in the second mode, for example, in the case of the data communication function, a 3.9 generation line is used, and, in the case of the moving image playing function, a moving image is played at a frame rate which is not low. Furthermore, in the second mode, for example, in the case of the charging function, the secondary battery is charged with a large current.

Figure 2:
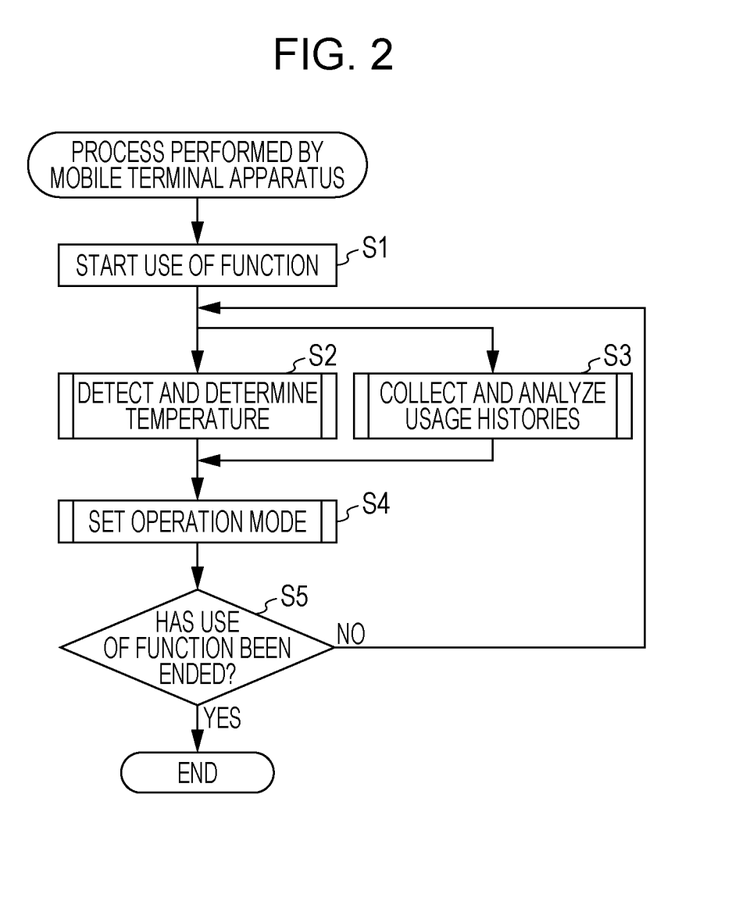
FIG. 2 is a flowchart illustrating an example of a process performed by the mobile terminal apparatus according to the first embodiment.

Next, operations performed by the mobile terminal apparatus 10 according to the first embodiment will be described. FIG. 2 is a flowchart illustrating an example of a process performed by the mobile terminal apparatus according to the first embodiment. The operations performed by the mobile terminal apparatus 10 will be described by using, as an example, the camera function among the functions in which a load on the CPU is high and the charging function.

The mobile terminal apparatus 10 starts use of the camera function in accordance with an operation performed by a user (step S1). The processing unit 20 activates the camera 12 so as to start to acquire image data, and performs image processing. The processing unit 20 stores the image data having been subjected to the image processing in the storage unit 15, and also displays the image data on the display unit 17. Until a predetermined number of user's usage histories of the camera function are accumulated, the mobile terminal apparatus 10 sets, as an initial set-up operation mode, for example, an image capturing mode in which an image is captured at an HD image quality in which resolution is low, such that the mobile terminal apparatus 10 is able to deal with long-period image capturing as well.

Figure 3:
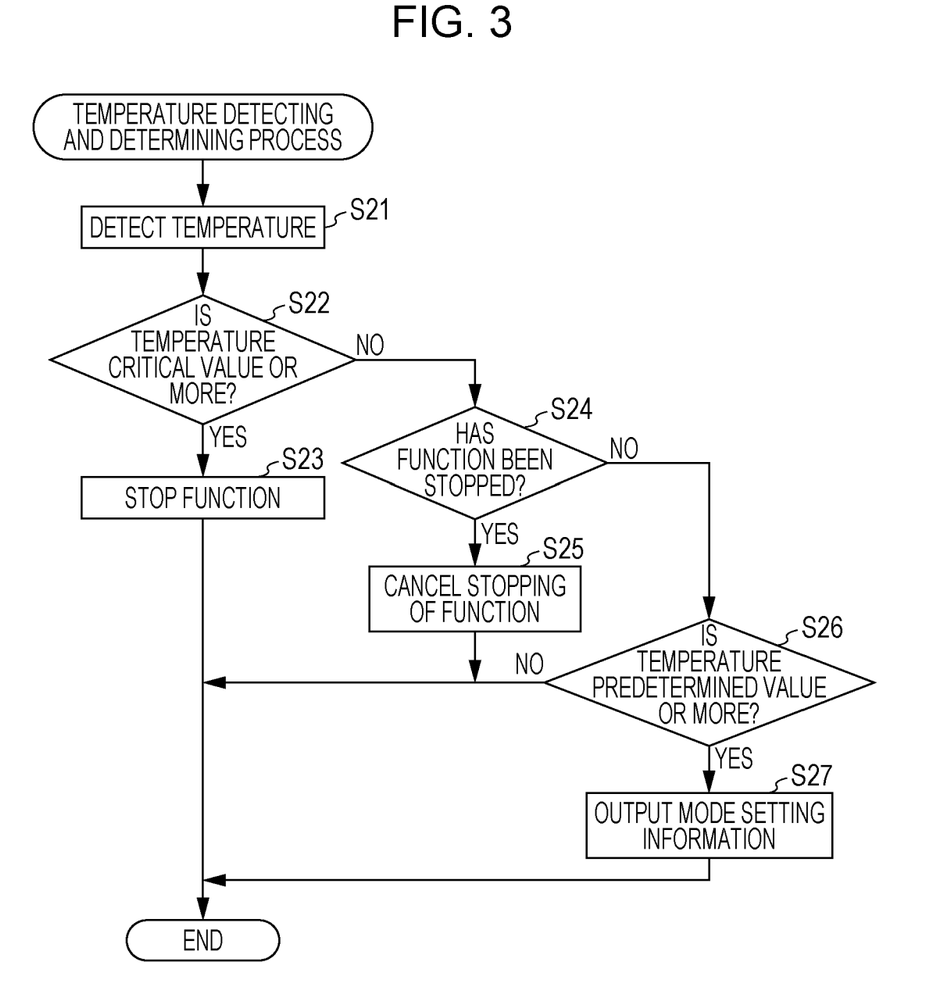
FIG. 3 is a flowchart illustrating an example of a temperature detecting and determining process.

When the use of the camera function is started, the mobile terminal apparatus 10 performs a process of detecting and determining a temperature (hereinafter referred to as a temperature detecting and determining process) of the mobile terminal apparatus 10 (step S2). FIG. 3 is a flowchart illustrating an example of the temperature detecting and determining process. The detection unit 11 detects a temperature of the mobile terminal apparatus 10 and outputs temperature information to the determination unit 21 included in the control unit 19 (step S21). When the temperature information is input from the detection unit 11, the determination unit 21 determines whether or not the temperature contained in the temperature information is a critical value or more (step S22). When the temperature is the critical value or more (Yes in step S22), the determination unit 21 stops the camera function (step S23).

When the temperature is less than the critical value (No in step S22), the determination unit 21 determines whether or not the camera function has been stopped (step S24). When the camera function has been stopped (Yes in step S24), the determination unit 21 cancels the stopping of the camera function (step S25). When the camera function is being performed (No in step S24), the determination unit 21 determines whether or not the temperature is a predetermined value or more (step S26).

When the temperature is the predetermined value or more (Yes in step S26), the determination unit 21 outputs mode setting information to the setting unit 23 (step S27). When the temperature is less than the predetermined value (No in step S26), the determination unit 21 ends the temperature detecting and determining process.

In the temperature detecting and determining process, when a temperature of the mobile terminal apparatus 10 is a critical value or more, the determination unit 21 of the mobile terminal apparatus 10 may stop, for example, the camera function, which is a cause of heat generation. When the temperature of the mobile terminal apparatus 10 is a predetermined value or more, the determination unit 21 of the mobile terminal apparatus 10 may also output mode setting information for setting, for example, the camera function, which is a cause of heat generation, in an operation mode (first mode) in which an amount of heat generated reduces. When the temperature of the mobile terminal apparatus 10 is less than the predetermined value, an action performed by each function of the mobile terminal apparatus 10 is not restricted.

Figure 4:
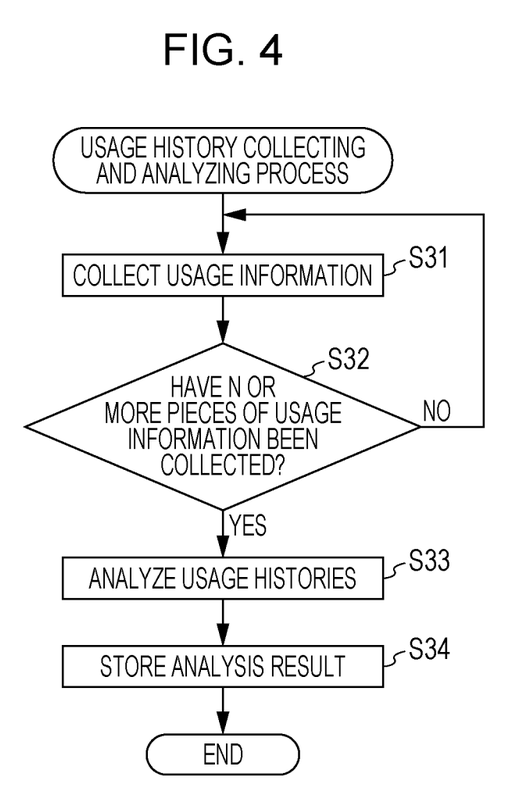
FIG. 4 is a flowchart illustrating an example of a usage history collecting and analyzing process.

Referring back to FIG. 2, the analysis unit 22 performs a camera function usage history collecting and analyzing process (step S3). The usage history collecting and analyzing process is performed in parallel with the temperature detecting and determining process. FIG. 4 is a flowchart illustrating an example of the usage history collecting and analyzing process. The analysis unit 22 collects usage information of the camera function and stores, as usage histories, the usage information in the storage unit 15 (step S31).

The analysis unit 22 determines whether or not N or more pieces of usage information have been collected (step S32). When N or more pieces of usage information have not been collected (No in step S32), the analysis unit 22 returns to step S31 and continues to collect usage information of the camera function. When N or more pieces of usage information have been collected (Yes in step S32), the analysis unit 22 reads usage histories from the storage unit 15 and analyzes the usage histories (step S33). The analysis unit 22 stores an analysis result in the storage unit 15 (step S34).

In the usage history collecting and analyzing process, the analysis unit 22 of the mobile terminal apparatus 10 may analyze user's usage histories of, for example, the camera function, which is a cause of heat generation, and calculate, for example, an average value and a standard deviation of usage time periods.

Figure 5:
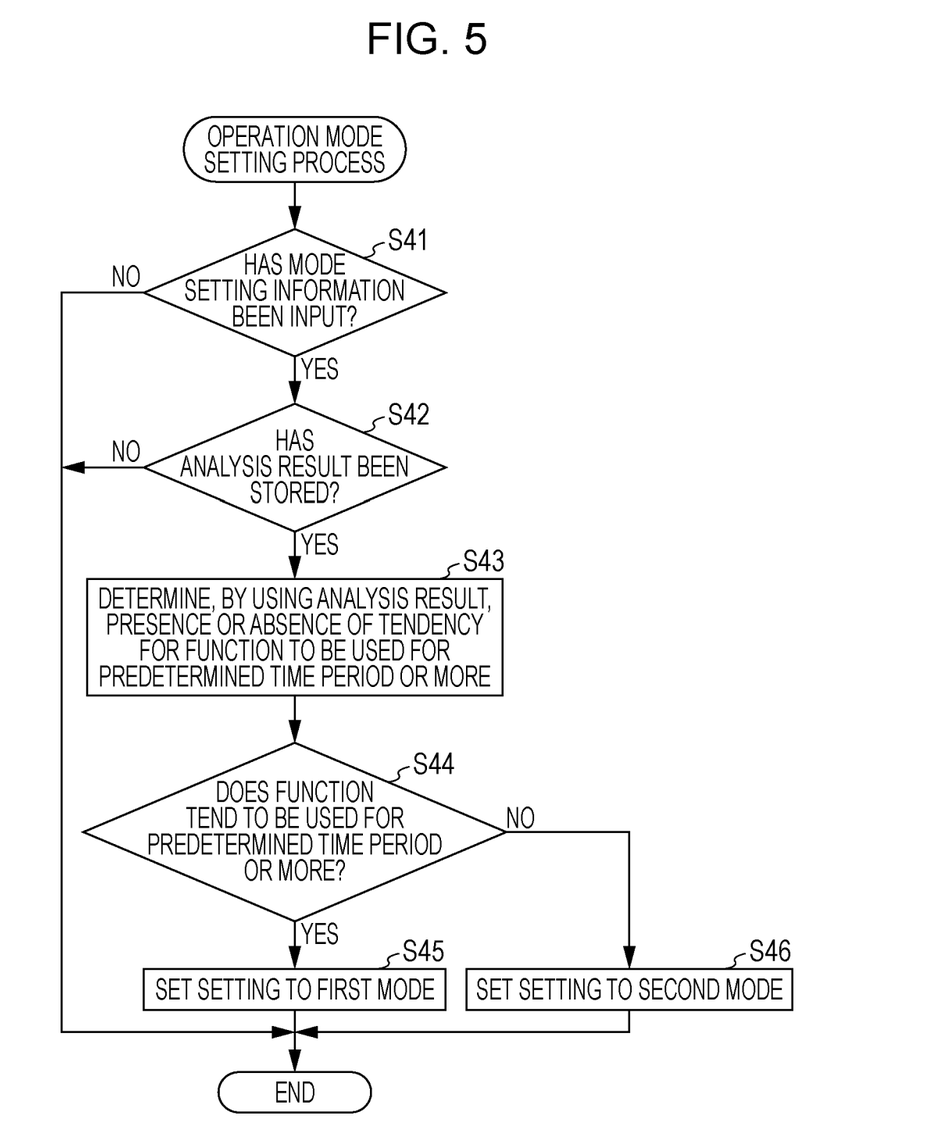
FIG. 5 is a flowchart illustrating an example of an operation mode setting process.

Referring back to FIG. 2, the setting unit 23 performs an operation mode setting process (step S4). FIG. 5 is a flowchart illustrating an example of the operation mode setting process. The setting unit 23 determines whether or not the mode setting information has been input from the determination unit 21 (step S41). When no mode setting information has been input (No in step S41), the setting unit 23 ends the operation mode setting process. When the mode setting information has been input (Yes in step S41), the setting unit 23 determines whether or not the analysis result has been stored in the storage unit 15 (step S42). When no analysis result has been stored in the storage unit 15 (No in step S42), the setting unit 23 operates in an initial set-up operation mode and ends the operation mode setting process. When the analysis result has been stored in the storage unit 15 (Yes in step S42), the setting unit 23 reads the analysis result from the storage unit 15.

The setting unit 23 determines, by using the analysis result, the presence or absence of a tendency for the camera function to be used for a predetermined time period or more (step S43). The setting unit 23 determines whether or not the camera function tends to be used for the predetermined time period or more (step S44). When the camera function tends to be used for the predetermined time period or more (Yes in step S44), the setting unit 23 sets the operation mode to the first mode (step S45). When the camera function does not tend to be used for the predetermined time period or more (No in step S44), the setting unit 23 sets the operation mode to the second mode (step S46).

In the operation mode setting process, when a user tends to use the camera function for a predetermined time period or more, the setting unit 23 of the mobile terminal apparatus 10 may set an operation mode to an operation mode in which an action is restricted.

Referring back to FIG. 2, the mobile terminal apparatus 10 determines whether or not the use of the camera function has been ended in accordance with an operation performed by the user (step S5). When the use of the camera function has been ended (Yes in step S5), the mobile terminal apparatus 10 ends processes involved in the use of the camera function. When the use of the camera function has not been ended (No in step S5), the mobile terminal apparatus 10 returns to step S2 and step S3, and repeatedly performs the processes of step S2 to step S4.

The mobile terminal apparatus 10 detects and determines a temperature of the mobile terminal apparatus 10, collects usage histories of the camera function, and analyzes them. Also, the mobile terminal apparatus 10 sets, by using an analysis result of the usage histories, an operation mode of the camera function. As a result, the operation mode of the camera function may be set in accordance with a tendency for the user to use the camera function for a predetermined time period or more, thereby making it possible to stop the temperature of the mobile terminal apparatus 10 from reaching a critical value.

For convenience of explanation, in the description of the operations performed by the mobile terminal apparatus 10 in FIGS. 2 to 5, the camera function, which is an example of the function in which a load on the CPU is high or the charging function, has been used. However, operations performed by the television receiving function, the data communication function, the moving image playing function, and the charging function are also the same as the above-described operations except for the structures of actions to be used and the details of operation modes, and description thereof is omitted in the description of the above-described operations. As an initial set-up operation mode, an operation mode in which a one-seg broadcast is received is set in the television receiving function, an operation mode in which a 3 or 3.5 generation line is used is set in the data communication function, an operation mode in which a moving image is played at a low frame rate is set in the moving image playing function, and an operation mode in which a charging current to the secondary battery is restricted is set in the charging function.

Figure 6:
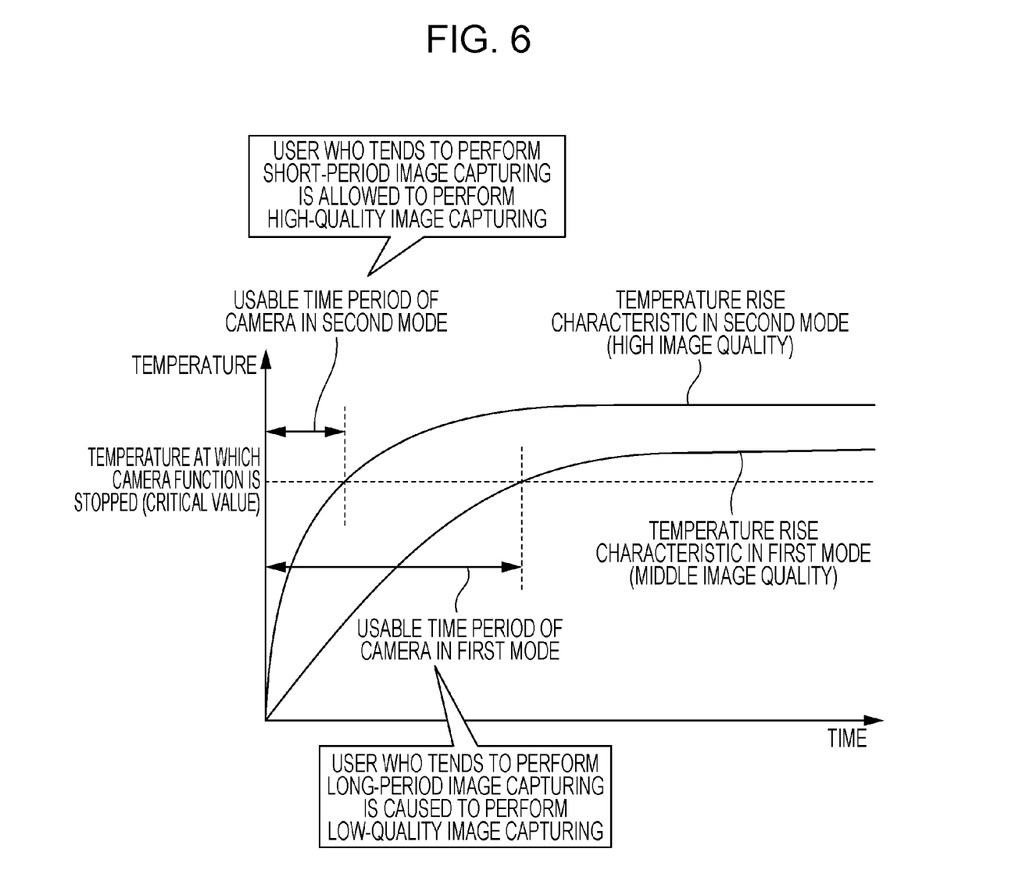
FIG. 6 illustrates an example of the relationships between operation modes and temperature rise characteristics.

Next the relationship between an operation mode and a temperature rise characteristic will be described. FIG. 6 illustrates an example of the relationships between operation modes and temperature rise characteristics. Here, as an operation mode, an operation mode of the camera function, which is an example of the function in which a load on the CPU is high or the charging function, will be described.

In the mobile terminal apparatus 10, when the camera function is activated by the user, the processing unit 20 performs image processing, thereby increasing an amount of heat generated. At this time, a load on the CPU in the image processing differs depending on an operation mode, and thus a temperature rise characteristic also differs from operation mode to operation mode. As illustrated in FIG. 6, for example, when the case where image capturing is performed in the first mode in which an image quality is restricted to an HD image quality, which is a middle image quality, is compared with the case where image capturing is performed in the second mode in which an image quality is an FHD image quality, which is a high image quality, in the case where image capturing is performed in the first mode, it takes more time for a temperature to reach a critical value or more. That is, in the camera function, in comparison to the case of the second mode, image capturing in the first mode may be performed for a longer time period, though an image quality is lower. In other words, in the camera function, short-period image capturing may be performed in the second mode in which an image quality is better.

For this reason, the mobile terminal apparatus 10 allows a user who tends to perform short-period image capturing with the camera function to perform image capturing in the second mode, thereby making it possible to enhance a level of user satisfaction with the camera function. The mobile terminal apparatus 10 causes a user who tends to perform long-period image capturing with the camera function to perform image capturing in the first mode, thereby making it possible to reduce the possibility of the camera function stopping during image capturing and reduce a loss of chances to capture an image.

Also, the mobile terminal apparatus 10 may set, by using a temperature rise characteristic exhibited while the camera function is being performed, a time period for which image capturing is able to be performed (usable time period of the camera function) for each operation mode. For example, in the case where use of the camera function is started at room temperature (20° C.), the usable time period of the camera function may be set to, for example, about 11 minutes when image capturing is performed in the first mode, and, for example, about 9 minutes when image capturing is performed in the second mode. The mobile terminal apparatus 10 displays, on the display unit 17, for example, the usable time period set for each operation mode and a remaining usable time period obtained by subtracting a usage time period from the usable time period, thereby enabling the user to know the remaining usable time period.

In this way, the mobile terminal apparatus 10 detects a temperature of the mobile terminal apparatus 10, determines whether or not the temperature is a predetermined value or more, and also collects usage histories of the function in which a load on the CPU is high or the charging function and analyzes them. When the temperature of the mobile terminal apparatus 10 is the predetermined value or more, the mobile terminal apparatus 10 refers to an analysis result of the usage histories, and, when the function tends to be used for a predetermined usage time period or more, the mobile terminal apparatus 10 sets an operation mode of the function to the first mode in which an action is restricted. When the function tends to be used for less than the predetermined usage time period, the mobile terminal apparatus 10 sets the operation mode to the second mode in which an action is not restricted. This may stop the temperature of the mobile terminal apparatus 10 from reaching a critical value. Also, an operation mode may be set in accordance with a tendency for the user to use each of the functions, thereby making it possible to enhance a level of user satisfaction.

The mobile terminal apparatus 10 sets, by using a temperature rise characteristic exhibited while the function in which a load on the CPU is high or the charging function is being performed, a usable time period for each operation mode. As a result, a remaining usable time period and the like may be displayed on the display unit 17, thereby enabling the user to know the remaining usable time period and the like in each operation mode.

Also, the mobile terminal apparatus 10 collects, as usage histories, usage histories of one or more among the camera function, the television receiving function, the data communication function, the moving image playing function, and the charging function, and sets an operation mode of each of these functions. As a result, actions corresponding to the respective functions may be restricted.

In the first embodiment, the process is performed in which a temperature of the mobile terminal apparatus 10 is detected when the function in which a load on the CPU is high or the charging function is performed; however, the process is not limited to this. For example, the mobile terminal apparatus 10 may detect a temperature at certain time intervals as long as a power supply of the mobile terminal apparatus 10 is on. As a result, for example, when the temperature of the mobile terminal apparatus 10 reaches a critical value due to irradiation with direct sunlight, all processes are stopped. That is, a process of putting the mobile terminal apparatus 10 into a sleep state or a process of turning off the power supply is performed, thereby making it possible to suppress a failure of the mobile terminal apparatus 10.

Furthermore, in the first embodiment, the process is performed in which usage histories are stored in the storage unit 15 of the mobile terminal apparatus 10 and the mobile terminal apparatus 10 analyzes the usage histories; however, the process is not limited to this. For example, the mobile terminal apparatus 10 may connect to the Internet via the communication unit 16 so as to store usage histories on a cloud service, the usage histories may be analyzed with an analysis server that interacts with the cloud service, and the mobile terminal apparatus 10 may receive an analysis result.

Second Embodiment

As just mentioned, as a second embodiment, an embodiment will be described below in which usage histories are stored on a cloud service. Here, components the same as those of the mobile terminal apparatus 10 according to the first embodiment are denoted by the same reference numerals, and description of the components and operations which are the same as those in the first embodiment is omitted. A mobile terminal apparatus 50 according to the second embodiment differs from the mobile terminal apparatus 10 according to the first embodiment in that usage histories are stored in a personal server provided on a cloud service and analyzed with an analysis server, and the mobile terminal apparatus 10 receives an analysis result.

Figure 7:
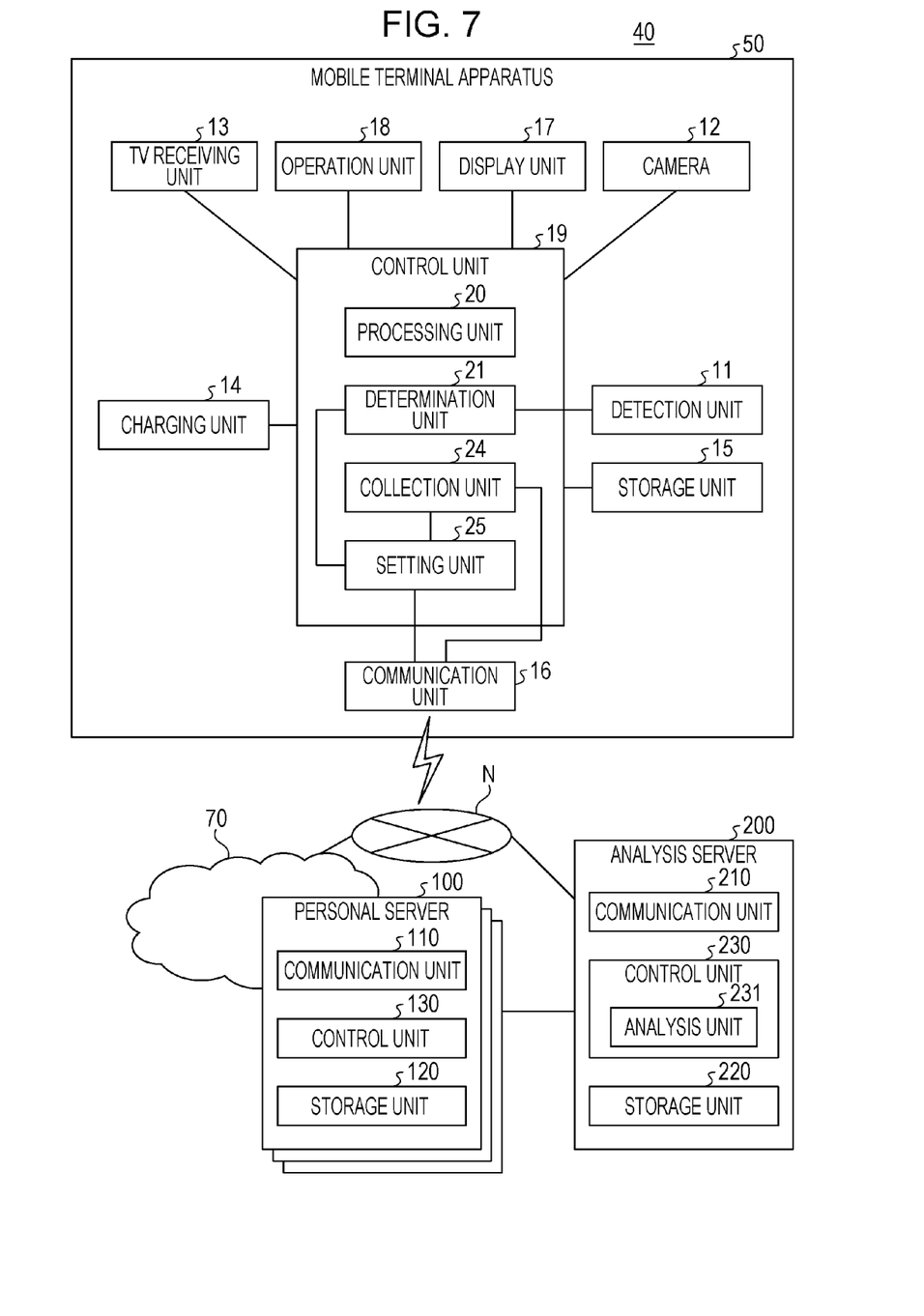
FIG. 7 is a block diagram illustrating an example of the configuration of a terminal control system according to a second embodiment.

FIG. 7 is a block diagram illustrating an example of the configuration of a terminal control system according to the second embodiment. A terminal control system 40 according to the second embodiment includes the mobile terminal apparatus 50, a personal server 100 provided on a cloud service 70, and an analysis server 200 that interacts with the cloud service 70, which are connected to each other with a network N. The mobile terminal apparatus 50 according to the second embodiment includes, in place of the analysis unit 22, a collection unit 24 that collects usage histories and transmits them to the personal server 100 via the communication unit 16. The mobile terminal apparatus 50 also includes, in place of the setting unit 23, a setting unit 25 that receives an analysis result from the analysis server 200 via the communication unit 16. Except for the above, the configuration of the mobile terminal apparatus 50 according to the second embodiment is the same as that of the mobile terminal apparatus 10. In addition, the personal server 100 in the second embodiment corresponds to the storage unit 15 in the first embodiment, and the analysis server 200 in the second embodiment corresponds to the analysis unit 22 in the first embodiment.

The collection unit 24 of the mobile terminal apparatus 50 performs a process of collecting and transmitting usage histories (hereinafter referred to as a usage history collecting and transmitting process) of the function in which a load on the CPU is high or the charging function. The collection unit 24 collects usage information of the function in which a load on the CPU is high or the charging function, and temporally stores, as usage histories, the usage information in the storage unit 15. The collection unit 24 also determines whether or not N or more pieces of usage information have been collected. When N or more pieces of usage information have not been collected, the collection unit 24 continues to collect usage information of the function in which a load on the CPU is high or the charging function. When N or more pieces of usage information have been collected, the collection unit 24 reads usage histories having been temporally stored from the storage unit 15 and transmits the usage histories to the personal server 100 via the communication unit 16.

The setting unit 25 receives an analysis result from the analysis server 200 via the network N and the communication unit 16. The setting unit 25 performs, by using the received analysis result, an operation mode setting process. Other processes performed by the setting unit 25 are the same as those performed by the setting unit 23 in the first embodiment.

The personal server 100 includes a communication unit 110, a storage unit 120, and a control unit 130. The personal server 100 receives usage histories from the mobile terminal apparatus 50 and stores the usage histories in the storage unit 120. The personal server 100 may also include an input unit (for example, a keyboard, a mouse, or the like) that accepts various operations from an administrator or the like of the personal server 100, and a display unit (for example, a liquid crystal display or the like) that displays various pieces of information.

The communication unit 110 is implemented by, for example, a network interface card (NIC) or the like. The communication unit 110 is a communication interface that is connected to the network N by cable and performs communication of information with the mobile terminal apparatus 50 via the network N. Also, the communication unit 110 is a communication interface that is connected to the analysis server 200 by cable and performs communication of information with the analysis server 200.

The storage unit 120 is implemented by, for example, a semiconductor memory device, such as a RAM or a flash memory, or a storage device, such as a hard disk or an optical disc. The storage unit 120 stores usage histories.

The control unit 130 is implemented by, for example, a CPU, an MPU, or the like executing, in a RAM serving as a working region, a program stored in an internal storage device. The control unit 130 may also be implemented by, for example, an integrated circuit, such as an ASIC or an FPGA. The control unit 130 controls the entire personal server 100 and stores, in the storage unit 120, usage histories received from the mobile terminal apparatus 50 via the network N and the communication unit 110. Also, the control unit 130 performs user authentication for access to the personal server 100. User authentication may be performed by using, for example, an ID of a subscriber identity module (SIM) card, an ID for a cloud service, a phone number and the like, and a password.

The analysis server 200 includes a communication unit 210, a storage unit 220, and a control unit 230. The analysis server 200 acquires usage histories from the personal server 100, analyzes them, and transmits an analysis result to the mobile terminal apparatus 50 via the network N. The analysis server 200 may also include an input unit (for example, a keyboard, a mouse, or the like) that accepts various operations from an administrator or the like of the analysis server 200, and a display unit (for example, a liquid crystal display or the like) that displays various pieces of information.

The communication unit 210 is implemented by, for example, a NIC or the like. The communication unit 210 is a communication interface that is connected to the network N by cable and performs communication of information with the mobile terminal apparatus 50 via the network N. Also, the communication unit 210 is a communication interface that is connected to the personal server 100 by cable and performs communication of information with the personal server 100.

The storage unit 220 is implemented by, for example, a semiconductor memory device, such as a RAM or a flash memory, or a storage device, such as a hard disk or an optical disc. The storage unit 220 stores various pieces of information.

The control unit 230 is implemented by, for example, a CPU, an MPU, or the like executing, in a RAM serving as a working region, a program stored in an internal storage device. The control unit 230 may also be implemented by, for example, an integrated circuit, such as an ASIC or an FPGA. The control unit 230 controls the entire analysis server 200. The control unit 230 also includes an analysis unit 231 and implements or performs information processing functions or operations, which will be described below. The internal configuration of the control unit 230 is not limited to the configuration illustrated in FIG. 7, and another configuration may be employed as long as it is a configuration in which information processing to be described is performed.

The analysis unit 231 acquires usage histories from the personal server 100 via the communication unit 210. The analysis unit 231 analyzes the acquired usage histories. The analysis unit 231 may use, as an analysis result, an average value or standard deviation of usage time periods, or the like. The analysis unit 231 transmits the analysis result to the mobile terminal apparatus 50 via the communication unit 210 and the network N.

Figure 8:
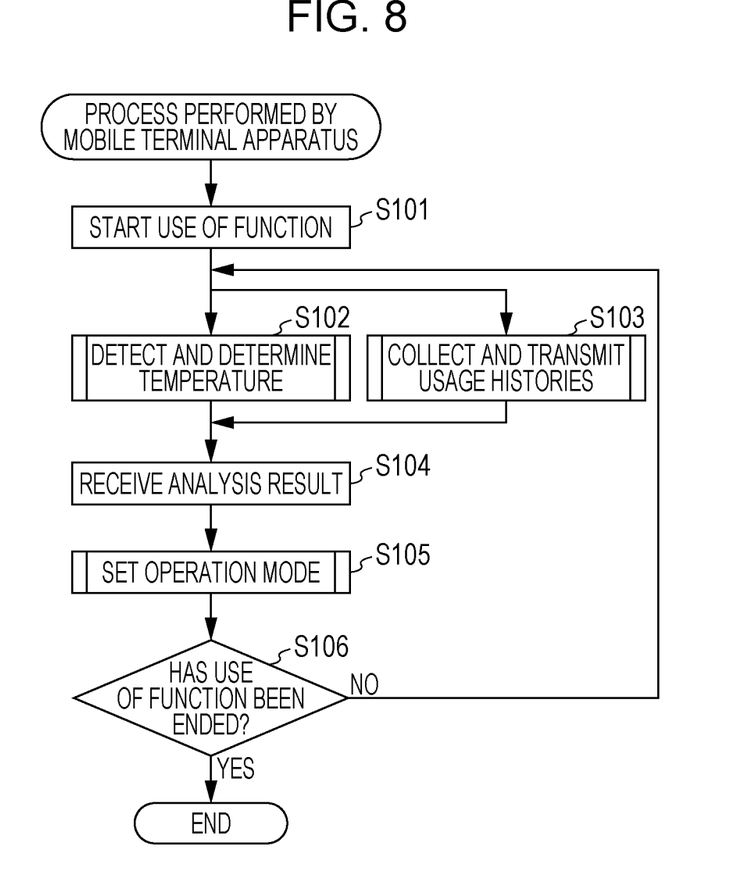
FIG. 8 is a flowchart illustrating an example of a process performed by a mobile terminal apparatus according to the second embodiment.

Next, operations performed by the terminal control system 40 according to the second embodiment will be described. FIG. 8 is a flowchart illustrating an example of a process performed by the mobile terminal apparatus according to the second embodiment. Operations performed by the mobile terminal apparatus 50 will be described by using, as an example, the camera function among the functions in which a load on the CPU is high and the charging function.

The mobile terminal apparatus 50 starts use of the camera function in accordance with an operation performed by the user (step S101). Here, the process of step S101 is the same as the process of step S1 in the first embodiment, and description thereof is omitted.

When the use of the camera function is started, the mobile terminal apparatus 50 performs a process of detecting and determining a temperature (hereinafter referred to as a temperature detecting and determining process) of the mobile terminal apparatus 50 (step S102). Here, the process of step S102 is the same as the process of step S2 in the first embodiment, and description thereof is omitted.

Figure 9:
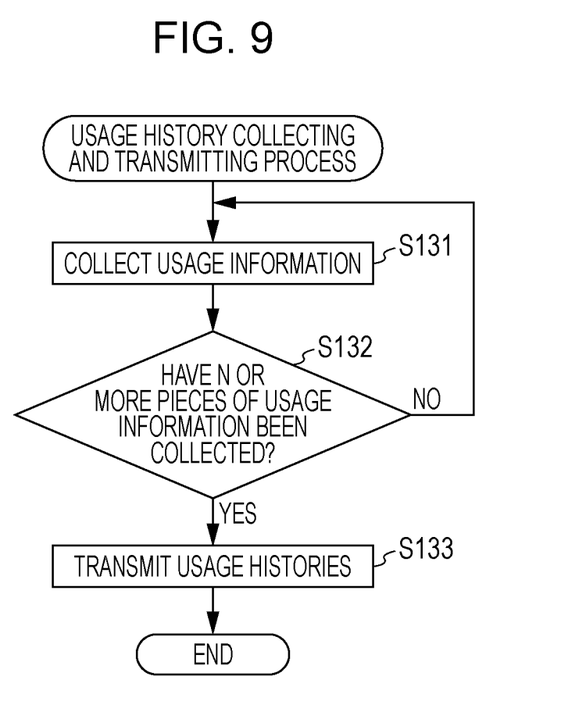
FIG. 9 is a flowchart illustrating an example of a usage history collecting and transmitting process.

The collection unit 24 performs a camera function usage history collecting and transmitting process (step S103). The usage history collecting and transmitting process is performed in parallel with the temperature detecting and determining process. FIG. 9 is a flowchart illustrating an example of the usage history collecting and transmitting process. The collection unit 24 collects usage information of the camera function and temporally stores, as usage histories, the usage information in the storage unit 15 (step S131).

The collection unit 24 determines whether or not N or more pieces of usage information have been collected (step S132). When N or more pieces of usage information have not been collected (No in step S132), the collection unit 24 returns to step S131 and continues to collect usage information of the camera function. When N or more pieces of usage information have been collected (Yes in step S132), the collection unit 24 reads usage histories having been temporally stored from the storage unit 15 and transmits the usage histories to the personal server 100 via the communication unit 16 (step S133).

In the usage history collecting and transmitting process, the collection unit 24 of the mobile terminal apparatus 50 may collect user's usage histories of, for example, the camera function, which is a cause of heat generation, and transmit the usage histories to the personal server 100.

Figure 10:
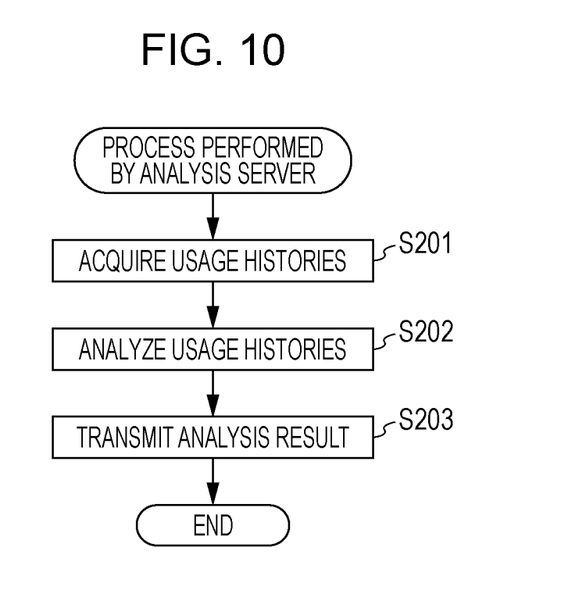
FIG. 10 is a flowchart illustrating an example of a process performed by an analysis server.

When the personal server 100 receives the usage histories, the personal server 100 stores the received usage histories in the storage unit 120. The analysis server 200 acquires the usage histories from the personal server 100 and analyzes them. FIG. 10 is a flowchart illustrating an example of a process performed by the analysis server. The analysis server 200 acquires the usage histories from the personal server 100 via the communication unit 210 (step S201). The analysis unit 231 of the analysis server 200 analyzes the acquired usage histories (step S202). The analysis unit 231 transmits an analysis result to the mobile terminal apparatus 50 via the communication unit 210 and the network N (step S203).

The analysis server 200 acquires usage histories from the personal server 100 and analyzes them, thereby making it possible to best utilize a capacity of the storage unit 15 of the mobile terminal apparatus 50 and reduce a processing load on the storage unit 15.

Referring back to FIG. 8, the setting unit 25 of the mobile terminal apparatus 50 receives the analysis result from the analysis server 200 via the network N and the communication unit 16 (step S104). The setting unit 25 performs an operation mode setting process (step S105). Here, except for use of the received analysis result, the process of step S105 is the same as the process of step S4 in the first embodiment, and description thereof is omitted.

The mobile terminal apparatus 50 determines whether or not the use of the camera function has been ended in accordance with an operation performed by the user (step S106). When the use of the camera function has been ended (Yes in step S106), the mobile terminal apparatus 50 ends processes involved in the use of the camera function. When the use of the camera function has not been ended (No in step S106), the mobile terminal apparatus 50 returns to step S102 and step S103, and repeatedly performs the processes of step S102 to step S105.

In this way, the mobile terminal apparatus 50 of the terminal control system 40 detects and determines a temperature of the mobile terminal apparatus 50, collects usage histories of the camera function, and transmits them to the personal server 100. The personal server 100 stores the usage histories. The analysis server 200 acquires the usage histories from the personal server 100, analyzes them, and transmits an analysis result to the mobile terminal apparatus 50. The mobile terminal apparatus 50 sets, by using the analysis result of the usage histories, an operation mode of the camera function. This makes it possible to best utilize a capacity of the storage unit 15 of the mobile terminal apparatus 50 and reduce a processing load on the storage unit 15. Also, as in the first embodiment, the operation mode of the camera function may be set in accordance with a tendency for the user to use the camera function for a predetermined time period or more, thereby making it possible to stop the temperature of the mobile terminal apparatus 50 from reaching a critical value.

For convenience of explanation, in the description of the operations performed by the mobile terminal apparatus 50 in FIGS. 8 to 10, the camera function, which is an example of the function in which a load on the CPU is high or the charging function, has been used. However, operations performed by other functions in which a load on the CPU is high and the charging function are also the same as the above-described operations except for the structures of actions to be used and the details of operation modes, and description thereof is omitted.

In each embodiment, in the data communication function, the process is performed in which an operation mode is set to the first mode when the data communication function tends to be used for a predetermined time period or more; however, the process is not limited to this. For example, when the mobile terminal apparatus downloads a file existing on the Internet, the mobile terminal apparatus may know in advance a size of the file. That is, when the mobile terminal apparatus downloads, for example, a 500-MByte file, the mobile terminal apparatus may know that the file to be downloaded is 500 MBytes in size. Suppose that the mobile terminal apparatus determines, by using a temperature rise characteristic of each operation mode, that a temperature of the mobile terminal apparatus will reach a critical value before downloading of the 500-MByte file is completed if, for example, a 3.9 generation line is used. Then, the mobile terminal apparatus sets an operation mode so as to perform downloading by using a 3 or 3.5 generation line. As a result, in comparison to the case of use of the 3.9 generation line, it takes a longer time period for the mobile terminal apparatus to download a file; however, failure of downloading due to a stopping of the data communication function in the middle of its operation may be suppressed.

Components of each unit illustrated in the drawings do not have to be physically configured as illustrated in the drawings. That is, the specific form in which the units are separated or integrated is not limited to that illustrated in the drawings. All or some of the units may be functionally or physically separated or integrated in any unit in accordance with respective loads, usage states, or the like. For example, the detection unit 11 may use a temperature sensor built into the control unit 19.

Furthermore, all or any number of processing functions performed by the respective units may be executed on a CPU (or a microcomputer, such as an MPU or a micro controller unit (MCU)). Additionally, it is obvious that all or any number of the processing functions may be executed on a program to be analyzed and executed by a CPU (or a microcomputer, such as an MPU or an MCU), or on hardware using wired logic.

Figure 11:
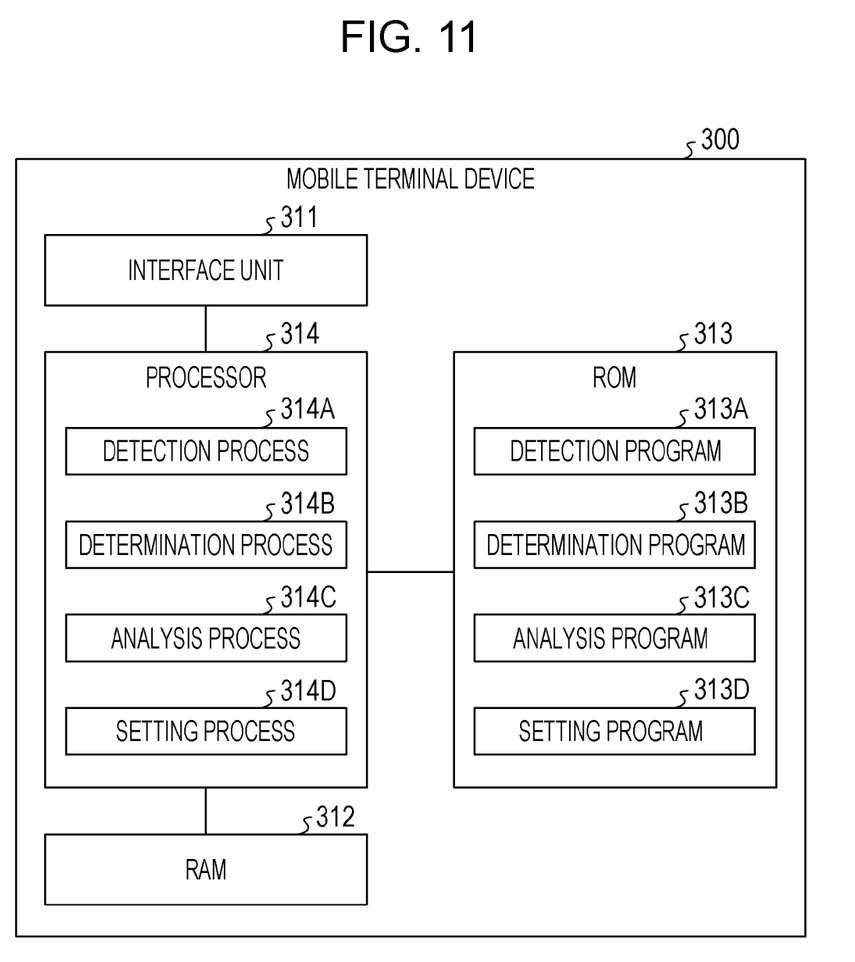
FIG. 11 illustrates an example of a mobile terminal device that executes a terminal control program.

Now, the processes described in the above embodiments may be implemented by causing a mobile terminal device to execute a program prepared in advance. An example of a mobile terminal device that executes a program having operations the same as those in the above embodiments will be described below. FIG. 11 illustrates an example of a mobile terminal device that executes a terminal control program.

A mobile terminal device 300 illustrated in FIG. 11 that executes a terminal control program includes an interface unit 311, a RAM 312, a read only memory (ROM) 313, and a processor 314. The interface unit 311 communicates with a detection unit, a camera, a TV receiving unit, a charging unit, and a communication unit, which are not illustrated, that are included in the mobile terminal device 300. The processor 314 controls the entire mobile terminal device 300.

The terminal control program that provides the operations the same as those in the above embodiments is stored in the ROM 313 in advance. The terminal control program may be stored in a drive-readable recording medium, which is not illustrated, in place of the ROM 313. Examples of the recording medium may include portable recording media, such as a compact disc-read only memory (CD-ROM), a digital versatile disc (DVD), and a Universal Serial Bus (USB) memory, and a semiconductor memory, such as a flash memory. As illustrated in FIG. 11, the terminal control program includes a detection program 313A, a determination program 313B, an analysis program 313C, and a setting program 313D. The programs 313A to 313D may be appropriately integrated or provided separately. A database in which temperature information, control information (a critical value and a predetermined value), a usage history, an analysis result, and so forth are stored is stored in the RAM 312.

The processor 314 reads these programs 313A to 313D from the ROM 313 and executes each of these read programs 313A to 313D. Then, as illustrated in FIG. 11, the processor 314 functions as a detection process 314A, a determination process 314B, an analysis process 314C, and a setting process 314D which correspond to the programs 313A to 313D, respectively.

The processor 314 detects a temperature, which has been input, of the mobile terminal device and determines whether or not the detected temperature is a predetermined value or more. The processor 314 collects usage histories of a function of the mobile terminal device and analyzes them. When the temperature is the predetermined value or more, the processor 314 refers to an analysis result of the usage histories, and, when the function tends to be used for a predetermined usage time period or more, the processor 314 sets an operation mode of the function to the first mode in which an action is restricted. When the function tends to be used for less than the predetermined usage time period, the processor 314 sets the operation mode to the second mode in which an action is not restricted. This may stop the temperature of the mobile terminal device from reaching a critical value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal apparatus comprising:
    a detection unit that detects a temperature of the mobile terminal apparatus;
    a determination unit that determines whether or not the detected temperature is a predetermined value or more;
    an analysis unit that collects and analyzes usage histories of a function of the mobile terminal apparatus, the usage history including time of use of the function; and
    a setting unit that, in response to the detected temperature being the predetermined value or more, refers to an analysis result of the usage histories, and in response to the time of use of the function in the usage history indicating that the function tends to be used for a predetermined usage time period or more, sets an operation mode of the function to a first mode in which an action performed by the function is restricted, and in response to the time of use of the function in the usage history indicating that the function tends to be used for less than the predetermined usage time period, sets the operation mode to a second mode in which the action performed by the function is not restricted.

2. The mobile terminal apparatus according to claim 1, wherein the setting unit further sets, by using a temperature rise characteristic exhibited while the function is being performed, usable time periods for the first mode and the second mode.

3. The mobile terminal apparatus according to claim 1,
    wherein the analysis unit collects, as the usage histories, usage histories of one or more among a camera function, a television receiving function, a data communication function, a moving image playing function, and a charging function, and
    wherein the setting unit sets, as the operation mode, an operation mode of one or more among the camera function, the television receiving function, the data communication function, the moving image playing function, and the charging function.

4. The mobile terminal apparatus according to claim 2,
    wherein the analysis unit collects, as the usage histories, usage histories of one or more among a camera function, a television receiving function, a data communication function, a moving image playing function, and a charging function, and
    wherein the setting unit sets, as the operation mode, an operation mode of one or more among the camera function, the television receiving function, the data communication function, the moving image playing function, and the charging function.

5. A non-transitory recording medium that is readable by a computer and stores a terminal control program causing the computer to execute an operation, the operation comprising:
    detecting a temperature, which has been input, of a mobile terminal apparatus;
    determining whether or not the detected temperature is a predetermined value or more;
    collecting and analyzing usage histories of a function of the mobile terminal apparatus, the usage history including time of use of the function; and
    in response to the temperature being the predetermined value or more, referring to an analysis result of the usage histories, and in response to the time of use of the function in the usage history indicating that the function tends to be used for a predetermined usage time period or more, setting an operation mode of the function to a first mode in which an action performed by the function is restricted, and in response to the time of use of the function in the usage history indicating that the function tends to be used for less than the predetermined usage time period, setting the operation mode to a second mode in which the action performed by the function is not restricted.

6. The non-transitory recording medium according to claim 5 that is readable by the computer and stores the terminal control program causing the computer to execute the operation, wherein the operation further includes setting, by using a temperature rise characteristic exhibited while the function is being performed, usable time periods for the first mode and the second mode.

7. The non-transitory recording medium according to claim 5, wherein the analyzing includes collecting, as the usage histories, usage histories of one or more among a camera function, a television receiving function, a data communication function, a moving image playing function, and a charging function, and wherein the setting includes setting, as the operation mode, an operation mode of one or more among the camera function, the television receiving function, the data communication function, the moving image playing function, and the charging function.

8. The non-transitory recording medium according to claim 6, wherein the analyzing includes collecting, as the usage histories, usage histories of one or more among a camera function, a television receiving function, a data communication function, a moving image playing function, and a charging function, and wherein the setting includes setting, as the operation mode, an operation mode of one or more among the camera function, the television receiving function, the data communication function, the moving image playing function, and the charging function.

9. A terminal control method comprising:

with a mobile terminal apparatus, detecting a temperature of the mobile terminal apparatus;

determining whether or not the detected temperature is a predetermined value or more;

collecting and analyzing usage histories of a function of the mobile terminal apparatus, the usage history including time of use of the function; and in response to the temperature being the predetermined value or more, referring to an analysis result of the usage histories, and in response to the time of use of the function in the usage history indicating that the function tends to be used for a predetermined usage time period or more, setting an operation mode of the function to a first mode in which an action performed by the function is restricted, and in response to the time of use of the function in the usage history indicating that the function tends to be used for less than the predetermined usage time period, setting the operation mode to a second mode in which the action performed by the function is not restricted.

* * * * *